United States Patent [19]

Lecolier et al.

[11] Patent Number: 4,535,135

[45] Date of Patent: Aug. 13, 1985

[54] ASSOCIATIONS OF BASES, RESULTING FROM THE COMBINATION OF A LITHIUM ALKYL OR ARYL WITH AN ALKALI METAL AMIDE OR HYDRIDE, POLYMERIZATION PROCESS IN WHICH THEY ARE USED, AND PRODUCT OBTAINED

[75] Inventors: Serge L. M. B. Lecolier, Janville Sur Juine; Serge F. Raynal, Draveil, both of France

[73] Assignee: Societe Nationale des Poudres et Explosifs, Paris, France

[21] Appl. No.: 544,807

[22] Filed: Oct. 24, 1983

Related U.S. Application Data

[62] Division of Ser. No. 340,078, Jan. 18, 1982, Pat. No. 4,435,312.

[30] Foreign Application Priority Data

Jan. 19, 1981 [FR] France ................................ 81 00854

[51] Int. Cl.$^3$ ................................................. C08F 4/48
[52] U.S. Cl. ..................................... 526/174; 585/511;
585/521; 585/527; 502/117
[58] Field of Search ................. 526/173, 174; 585/511,
585/521, 527; 502/117

[56] References Cited

U.S. PATENT DOCUMENTS

| | | | |
|---|---|---|---|
| 3,128,318 | 4/1964 | Meisinger et al. | 585/527 |
| 3,274,168 | 9/1966 | Miller et al. | 526/173 |
| 3,294,768 | 12/1966 | Wofford | 526/174 |
| 3,944,528 | 3/1976 | Loveless | 526/174 |

*Primary Examiner*—Paul R. Michl
*Assistant Examiner*—A. H. Walker
*Attorney, Agent, or Firm*—Bucknam and Archer

[57] ABSTRACT

The invention relates to new associations of strong bases, having the following general formula:

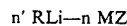

n' RLi—n MZ in which: n and n' are the numbers of mols of each compound, R is an alkyl or aryl radical, M is an alkali metal chosen from amongst lithium, sodium or potassium and Z is a hydride or an inorganic amide, the ratio n/n' being between 0.2 and 50.

It is preferred to use bases in which the metal of the alkali metal amide or hydride is potassium or sodium. These associations are formed very rapidly and can be applied to anionic polymerization, in particular of conjugated dienes, in a solvent of low polarity or an apolar solvent.

The polymers thus obtained contain a high percentage of 1,2 or 3,4 structures.

11 Claims, No Drawings

ASSOCIATIONS OF BASES, RESULTING FROM THE COMBINATION OF A LITHIUM ALKYL OR ARYL WITH AN ALKALI METAL AMIDE OR HYDRIDE, POLYMERIZATION PROCESS IN WHICH THEY ARE USED, AND PRODUCT OBTAINED

This application is a division, of application Ser. No. 340,078 filed Jan. 18, 1982 now U.S. Pat. No. 4,435,312.

The invention relates to a new association of bases, resulting from the combination of two strong bases, and to its application to anionic polymerisation, in particular of conjugated dienes.

The increase in the basicity of alkali metal amides when they are associated with alcoholates or with alkali metal salts, such as potassium thiocyanate, is well known. The properties of these "complex" bases are illustrated by the following French Patents of the Applicant Company: Nos. 2,352,834 and 2,430,428.

Despite their remarkable properties, especially as regards the anionic polymerisation of vinylic derivatives, these bases cannot easily be used for the polymerisation of conjugated dienes such as butadiene or isoprene. Moreover, it is impossible to form the same complex by replacing the amides by alkali metal hydrides, which are bases of substantially identical basic power.

Furthermore, it is known to use strong bases, such as lithium alkyls or aryls, as initiators for the anionic polymerisation of conjugated dienes.

However, when this anionic polymerisation is carried out in an apolar solvent or a solvent of low polarity (n-hexane or toluene), this being by far the most advantageous solution, the stereochemistry of the reaction leads to 90% of the 1,4 structure and only 10% of the 1,2 or 3,4 structures.

It is known that it is desirable to increase the percentage of vinylic linkages in the polymer so as to increase the curing rate and improve the mechanical properties of the polymers, in particular as regards their shock-absorbing capacity.

Thus, to overcome these disadvantages, it was proposed to carry out the reaction in the presence of tertiary amines such as N,N,N',N'-tetramethylethylenediamine. The properties of these complexes, known as Langer complexes, are illustrated by British Pat. No. 1,051,269.

This solution, although advantageous on a laboratory scale, is nevertheless rather expensive from the industrial point of view.

One object of the invention is to propose a new association of two strong bases, the basic power of which is greater than that of each of the two bases from which it is formed.

A further object of the invention is to apply these new associations to the polymerisation of conjugated dienes, in particular in non-polar solvents.

The association has the following general formula:

in which: n and n' are the numbers of mols of each compound, R is an alkyl or aryl radical, M is an alkali metal chosen from amongst lithium, sodium or potassium and Z is a hydride or an inorganic amide, the ratio n/n' being between 0.2 and 50.

Amongst the alkyl or aryl radicals, the following radicals may be mentioned without implying a limitation: methyl, ethyl, n-propyl, isopropyl, n-butyl, isobutyl, t-butyl, n-amyl, n-hexyl, n-octyl, n-decyl, 2-butenyl, cyclopentylmethyl, cyclohexylethyl, cyclopentylethyl, methylcyclopentylethyl, 4-cyclohexenylethyl, 2-phenylethyl, 2-phenylpropyl, methylnaphthylethyl, cyclopentyl, cyclohexyl, methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, phenylcyclopentyl, phenylcyclohexyl, phenyl, tolyl, xylyl, ethylphenyl, naphthyl, methylnaphthyl, dimethylnaphthyl, ethylnaphthyl and cyclohexylphenyl.

The preferred alkyl radicals are those containing 2 to 8 carbon atoms, in particular the butyl radical.

The preferred aryl radicals are the phenyl or naphthyl radicals.

The alkali metal of the hydride or amide must preferably be sodium or potassium, so as to create an advantageous cation effect. Sodium is the preferred cation.

The inorganic alkali metal amides, like the alkali metal hydrides, are very strong bases of substantially equivalent basic power.

In fact, on the basicity scale, the following compounds are in decreasing order:

However, the alkali metal amide is preferred because of the substantially superior results which are obtained with the latter as regards anionic polymerisation.

It must be emphasised that the alkali metal amides used in the invention are inorganic and that the nitrogen atom is not substituted by an organic radical.

Although the ratio n/n' can vary considerably, it is preferably either equal to or greater than 1 and more particularly between 1 and 25, especially because of the higher proportion of vinylic structures obtained.

These associations are in the form of aggregates which can be isolated perfectly from the medium in which they were formed.

It is clear that a well-defined product is therefore involved, not a transitory and unstable form of association. It has been possible to keep these complexes for 15 days without their showing any deterioration as regards their properties.

The measurement of the basicity which was carried out in an organic medium for some of these associations showed that there was a totally surprising synergistic effect.

The following basicity scale is obtained:

Without being bound by any particular theory, it may be considered that the aggregates are, for example in the case of the association n-BuLi—NaNH$_2$, in the following form:

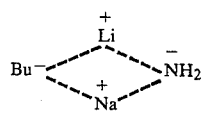

and more generally:

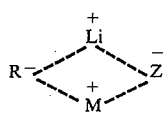

The formation of these associations is very rapid, and virtually instantaneous, at ambient temperature, and this is an additional advantage of the invention.

It is necessary only to form the associations under an inert atmosphere and in the absence of moisture.

One process for obtaining the associations of the invention consists in reacting the alkali metal amide or hydride, undissolved or dissolved in a solvent, with the organometallic compound, the latter being introduced under an inert gas or in vacuo. The reaction is very rapid at 25° C.

The reaction can also be carried out at a lower temperature. In this case, however, the complexing time is longer. On the other hand, at a higher temperature, the reaction is instantaneous.

It is obvious that other processes can also be used, in particular by reversing the order of introduction of the reactants into the flask.

The solvents which can be used for preparing the initiators according to the invention must be aprotic and can be polar, weakly polar or apolar. Polar solvents can be used provided that their structure does not make them susceptible to the action of the associations according to the invention. Thus, dimethyl sulphoxide (DMSO) and dimethylformamide (DMF) are degraded by the associations and must preferably be avoided.

However, these associations can be prepared very easily in an apolar or weakly polar solvent such as toluene or compounds containing double or triple bonds, and this is another advantage of the invention.

This advantage is even clearer when these associations are applied to anionic polymerisation, and this application will be described below.

In fact, a particularly advantageous application of the bases according to the invention consists in using them as anionic polymerisation initiators.

In this respect, it is appropriate to make a clear distinction between pure anionic polymerisation, which is involved throughout the following text, and anionic coordination polymerisation, which involves initiators such as salts of aluminium, of antimony and of transition metals (for example the so-called Ziegler-Natta bimetallic catalysts), and which bears no relationship to the field of application of the invention.

The associations can be used to initiate the polymerisation of any monomers capable of undergoing anionic polymerisation by the opening of an ethylenic double bond or a heterocyclic ring, and amongst these monomers, there may be mentioned ethylenic monomers such as styrene or methyl methacrylate, heterocyclic monomers, and dienes such as isoprene or butadiene.

These monomers are well known to those skilled in the art and are described, in particular, in French Pat. No. 2,410,005.

However, these associations are particularly valuable for initiating the anionic polymerisation of conjugated dienes. In fact, the alkali metal amides or hydrides have an astoundingly marked activating power with respect to lithium alkyls or aryls as anionic polymerisation initiators. This synergistic effect brings improvements as regards the reaction rate, the nature of the solvent which it is possible to use, and the higher percentage of vinylic structures present in the final polymer.

On these last two points, which are particularly important, the following fact must be clearly emphasised: lithium butyl exists in the hexameric form, which is inert as regards anionic polymerisation. When a non-polar solvent is used, this hexameric form is very slightly and slowly dissociated, which explains the structure of the product obtained. On the other hand, polar solvents, such as tetrahydrofuran (THF), dissociate the hexameric form very rapidly, and this permits the very rapid action of the lithium butyl, in this case, and the vinylic structure of the product obtained. Admittedly, the association of an alkali metal amide or hydride with lithium butyl makes it possible to dissociate the hexameric form and to lead to the same effect as THF, but, in addition, this effect is much more pronounced and the percentage of vinylic structures obtained is even higher, which illustrates the new function of the association. It is not therefore a simple dissociation of the hexameric form which is involved.

These bases also permit the synthesis of living polymers, and consequently they are applied to the synthesis of block copolymers (for example styrene/diene).

A second consequence is the proportionality relationship between the degree of polymerisation and the monomer concentration. Thus, there is a linear relationship $\overline{DPn}=k(M)$, $\overline{DPn}$ being the number-average degree of polymerisation and being equal to $(M)/(C)$, $(C)$ corresponding to the catalyst concentration and $(M)$ being the concentration in amount of monomer. In this case, the molecular weight is proportional to the amount of lithium alkyl or aryl present. This property only applies to monomers which do not polymerise directly with the alkali metal amide.

Although all the bases of the present invention are suitable for application to anionic polymerisation, it has been found that it is advantageous to use bases in which the metal of the alkali metal amide or hydride is potassium or sodium. A very favourable cation effect is thus obtained. More particularly, it is very advantageous to use sodium amide or hydride.

The ratio $\dfrac{n}{n'} = \dfrac{\text{alkali metal amide or hydride}}{\text{lithium alkyl or aryl}}$ is between 0.2 and 50, preferably greater than or equal to 1 and more particularly between 1 and 25.

The process for carrying out this application consists in adding, to the preformed base, the monomer to be polymerised, which may or may not be in a solvent. At ambient temperature, the reaction is instantaneous and a large temperature rise can be observed.

The solvent which can be used can be the same as that used for the formation of the bases according to the invention, but can also be different.

It is obvious that one of the great advantages of the invention consists in using non-polar solvents. The reaction temperature is preferably between $-10°$ and $+40°$ C. so as to obtain the maximum rate whilst avoiding side reactions.

The reaction is terminated by adding water or alcohol.

Analysis of the microstructure obtained shows that, for isoprene, the addition has taken place in the 1,2- and 3,4-positions to an extent of more than 70% and even to an extent of more than 97% in the case of $NaNH_2$.

The examples which follow illustrate the invention.

PREPARATION OF THE ASSOCIATIONS

1. Preparation of the association NaNH$_2$—BuLi $25.10^{-3}$ mol of NaNH$_2$ in 30 ml of toluene, and $6.10^{-3}$ mol of BuLi, are introduced into a round-bottomed flask kept under an argon atmosphere and at ambient temperature. The reaction takes place in three minutes and a large temperature rise can be observed. The same procedure is followed with $2.10^{-3}$ mol of BuLi.

2. Preparation of the association NaH—BuLi

In the same manner as above, $25.10^{-3}$ mol of NaH and 35 ml of toluene are introduced into a round-bottomed reaction flask, followed by $2.10^{-3}$ mol of BuLi. The reaction takes place in three minutes at ambient temperature.

3. Preparation of the association NaH—φLi

The final product is obtained by following the same procedure as above.

4. The following associations were also prepared:

BuLi—KNH$_2$ and BuLi—LiNH$_2$.

5.
The same products as those mentioned in the above examples are obtained under the same conditions, except that tetrahydrofuran is used as the solvent.

ANIONIC POLYMERISATION

1. Polymerisation of isoprene by the association alkali metal amide—lithium n-butyl (a) These experiments are carried out with associations obtained with $25.10^{-3}$ mol of alkali metal amide and $2.10^{-3}$ mol of n-BuLi in 35 ml of solvent.

$10^{-1}$ mol of isoprene is then introduced.

After a latency period of 10 minutes, the polymerisation takes place very rapidly. The reaction is stopped after 15 minutes by introducing methanol. The polymer formed is then precipitated in methanol, filtered off and dried in vacuo. The yield is 100%.

The results, according to the solvents and bases used, are summarised in the table below.

| Association | THF | | | Toluene | | |
| --- | --- | --- | --- | --- | --- | --- |
|  | % of 1,4 | % of 1,2 | % of 3,4 | % of 1,4 | % of 1,2 | % of 3,4 |
| n-BuLi LiNH$_2$ | 18 | 18 | 64 | 91 | 0 | 9 |
| n-BuLi KNH$_2$ | 33 | 28 | 39 | 49 | 16 | 35 |
| n-BuLi NaNH$_2$ | 9 | 23 | 68 | 17 | 27 | 56 |

(b) An experiment in 35 ml of THF with $3.10^{-2}$ mol of isoprene, $2.10^{-3}$ mol of n-BuLi and $25.10^{-3}$ mol of alkali metal amide gave the following result:

| Yield | % of 1,4 | % of 1,2 | % of 3,4 |
| --- | --- | --- | --- |
| 100% | 6 | 30 | 64 |

(c) An experiment carried out under the same conditions as the preceding experiment, but simply with n-BuLi, gave the following result:

| Yield | % of 1,4 | % of 1,2 | % of 3,4 |
| --- | --- | --- | --- |
| 100% | 14 | 27 | 59 |

2. Polymerisation of isoprene by the associations NaH—n-BuLi and NaH—φLi

The procedure is the same as for Example 1. The associations are obtained with $25.10^{-3}$ mol of NaH and $6.10^{-3}$ mol of n-BuLi or φLi in 35 ml of toluene.

$10^{-1}$ mol of isoprene is introduced.

The yield is 100% after 15 minutes.

The results are summarised in the table below.

| Association | % of 1,4 | % of 1,2 | % of 3,4 |
| --- | --- | --- | --- |
| NaH—n-BuLi | 34.4 | 11.4 | 54.2 |
| NaH—φLi | 27.5 | 16 | 56.5 |

3. Influence of the ratio sodium amide/lithium butyl for a given amount of sodium amide

| $r = \dfrac{(\text{NaNH}_2)}{(\text{n-BuLi})}$ | % of 1,4 | % of 1,2 | % of 3,4 |
| --- | --- | --- | --- |
| 0.4 | 12 | 30 | 58 |
| 0.8 | 17 | 28 | 55 |
| 1.56 | 16 | 27 | 57 |
| 12.5 | 17 | 27 | 56 |
| 25 | 20 | 25 | 55 |

4. Comparison experiments

Under the same operating conditions which follow: $10^{-1}$ mol of monomer and $6.10^{-3}$ mol of catalyst, the polymerisation of isoprene, initiated by lithium butyl and lithium phenyl, used without an activator, gives polymers with a different structure and a lower degree of conversion.

| Initiator | Solvent | Polymerisation time | Yield | Structure | | |
| --- | --- | --- | --- | --- | --- | --- |
|  |  |  |  | 1,4 | 1,2 | 3,4 |
| n-BuLi | PhCH$_3$ | 15 minutes | 20 | 90 | 0 | 10 |
| PhLi | PhCH$_3$ | 15 minutes | 23 | 75 | 0 | 25 |

5. Bulk polymerisation of isoprene

The association NaNH$_2$—n-BuLi is prepared in toluene from $25.10^{-3}$ mol of alkali metal amide and $2.10^{-3}$ mol of n-BuLi. The toluene is then evaporated off.

$10^{-1}$ mol of isoprene is then introduced.

The following results are obtained:

| Yield | % of 1,4 | % of 1,2 | % of 3,4 |
| --- | --- | --- | --- |
| 100% | 10 | 25 | 65 |

6. Polymerisation of butadiene with n-BuLi-NaNH$_2$

The experiments are carried out under the same conditions ($2.10^{-2}$ mol of n-BuLi and $25.10^{-3}$ mol of NaNH$_2$).

| Solvent | Reaction time | Yield | % of 1,2 | % of 1,4 |
|---------|---------------|-------|----------|----------|
| φMe     | 10'           | 100   | 86       | 14       |
| THF     | 10'           | 100   | 90       | 10       |

A similar experiment, carried out in THF with n-BuLi by itself, and under the same operating conditions, gives the following results:
Reaction time: 15 hours.
Yield: 100%;
% of 1,2: 77;
% of 1,4: 23.

7. Copolymerisation of styrene and butadiene with $NaNH_2$—n-BuLi $5.10^{-3}$ mol of styrene (5 cc) is introduced into a round-bottomed flask in which the association $NaNH_2$—n-BuLi (respectively $25.10^{-3}$ mol and $2.10^{-3}$ mol) has been formed in toluene. After a reaction time of 10 minutes, $5.10^{-3}$ mol of isoprene is introduced.

After 10 minutes, the yield is 100% and the copolymer styrene/isoprene is obtained.

8. Polymerisation of methyl methacrylate by $NaNH_2$—n-BuLi

In the same manner as for the preceding examples, $5.64.10^{-2}$ mol of the monomer is added to the association prepared, in a solvent, from $25.10^{-3}$ mol of $NaNH_2$ and $2.10^{-3}$ mol of n-BuLi.

The following results are obtained according to the solvents:

| Solvent | $\overline{Mn}$ | $\overline{Mw}$ | I   |
|---------|-----------------|-----------------|-----|
| Hexane  | 29,000          | 52,000          | 1.8 |
| Toluene | 22,500          | 105,000         | 4.7 |
| Dioxane | 19,000          | 86,000          | 4.5 |
| DME     | 32,000          | 85,000          | 2.7 |
| THF     | 15,000          | 22,000          | 1.5 |
| In bulk | 21,000          | 15,000          | 7.1 |

$\overline{Mn}$: number-average molecular weight
$\overline{Mn}$: weight-average molecular weight
I: polydispersity index.

The following results are obtained according to the associations, the proportions of hydride and amide being identical.

|                  | $\overline{Mn}$ | $\overline{Mw}$ | I   |
|------------------|-----------------|-----------------|-----|
| NaH—n-BuLi       | 19,000          | 170,000         | 8.9 |
| $NaNH_2$—MeLi    | 94,000          | 510,000         | 6.9 |
| $NaNH_2$— Li     | 16,000          | 91,000          | 5.7 |

We claim:
1. Process for the polymerisation or copolymerisation of vinylic, heterocyclic or diene monomers capable of undergoing anionic polymerisation by the opening of an ethylenic double bond or an heterocyclic ring, wherein said monomers are initiated, in the presence or absence of a solvent, with an association of bases, of formula:

$$n'RLi—nMZ$$

wherein n and n' are the numbers of mols of each compound, R is alkyl or aryl, M is sodium or potassium and Z is an hydride or an inorganic amide, the ratio n/n' being between 0.2 and 50.

2. The process according to claim 1 wherein the monomer is a conjugated diene.

3. The process according to claim 2 wherein the monomer is isoprene.

4. The process according to claim 1 which is carried out in the presence of a solvent which is apolar or weakly polar.

5. The process according to claim 4 wherein the solvent is the monomer to be polymerised.

6. The process according to claim 1 wherein the polymerisation temperature is between −10° and +40° C.

7. The process according to claim 1 wherein the base is formed from sodium amide and a lithium alkyl or aryl.

8. The process according to claim 1 wherein the ratio n/n' is between 1 and 25.

9. The process according to claim 1 wherein the alkali metal M is sodium.

10. The process according to claim 9 wherein R is butyl napthyl or phenyl.

11. The process according to claim 1 wherein the association of bases is $NaNH_2$—n-BuLi, NaH—φLi, NaH—n-BuLi, nBuLi—$KNH_2$ or nBuLi—$LiNH_2$.

* * * * *